June 10, 1930.   J. RAH   1,762,525
DISTRIBUTION BOX FOR CABLES OF SAME POLARITY
Filed July 10, 1925
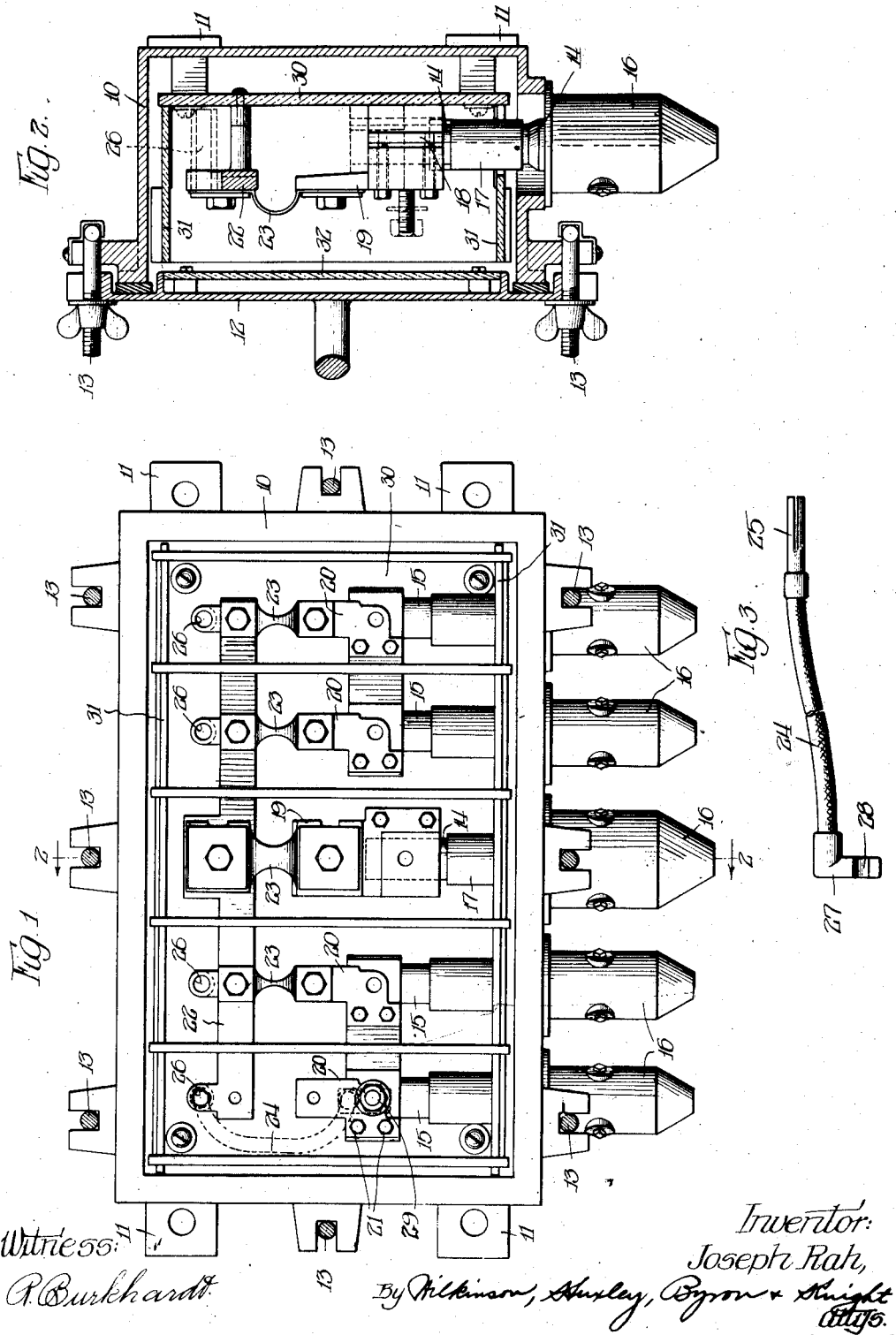
Witness:
R. Burkhardt
Inventor:
Joseph Rah,
By Wilkinson, Huxley, Byron & Knight
Attys.

Patented June 10, 1930

1,762,525

UNITED STATES PATENT OFFICE

JOSEPH RAH, OF CHICAGO, ILLINOIS, ASSIGNOR TO G. & W. ELECTRIC SPECIALTY CO., OF CHICAGO, ILLINOIS, A CORPORATION OF ILLINOIS

DISTRIBUTION BOX FOR CABLES OF SAME POLARITY

Application filed July 10, 1925. Serial No. 42,638.

This invention relates to a distribution box for single conductor cables of the same polarity.

One object of the invention is to provide a distribution box for single conductor cables of the same polarity, including an arrangement wherein simple and reliable means are employed to protect the operator in placing a fuse in circuit and wherein an ammeter may be easily placed in circuit and disconnected therefrom.

Another object is to provide a distribution box arrangement adapted to meet the various commercial requirements.

In a somewhat different aspect, the invention contemplates the provision of an improved process of inserting fuses in electrical circuits. The novel process disclosed herein is particularly adapted to protect parts of the electrical circuit surrounding the fuse during the blowing of a fuse or the insertion of a new fuse, and the process also eliminates the danger of being burned or otherwise injured to which a person changing the fuse is ordinarily subjected.

These and other objects are accomplished by means of the arrangement shown on the accompanying sheet of drawings, in which—

Figure 1 is a front elevation of an upright distribution box, with the cover removed and embodying my invention;

Figure 2 is a sectional view taken in plane of line 2—2 of Figure 1; and

Figure 3 is a view of a flexible current conducting member adapted to be readily connected in circuit and disconnected therefrom, which member forms a shunt connection around a fuse as the latter is being placed in circuit.

The various novel features of the invention will be apparent from the following description and drawings, and will be particularly pointed out in the appended claims.

Referring to the figures of the drawings, it will be noted that my invention is illustrated in connection with a distribution box having a main body portion 10 provided with bracket members 11, whereby the box may be secured to any suitable support, such as a wall. The box includes a cover 12, which may be secured to the body 10 by any suitable means such as shown at 13.

The distribution box shown in the drawings is adapted to receive a single conductor or feeder having a certain polarity and to distribute the current among a plurality of branch cables. Thus, the distribution box is, as illustrated, adapted to be connected to a single main feeder which must be of a certain polarity. As shown, a main feeder cable 14 and four branch feeder cables 15 are provided, each cable extending through its associated pothead 16. The main feeder cable 14 is secured to a bushing 17, which is secured within a clamp or cable lug 18, one part of which forms a contact block 19. Similar clamping means and contact blocks 20 are provided for the branch single conductor cables 15, the latter of which are secured to the former by clamping studs 21. Mounted within the box is a bus bar 22, which extends longitudinally of the box and is arranged opposite the contact blocks 19 and 20. Normally, the contact block 19 and the other contact blocks 20 are respectively connected to the bus bar 22 by suitably designed fuses 23. It is dangerous to connect a contact block to the bus bar with a fuse unless some means is provided for forming a shunt connection between said contact block and bus bar to protect the operator against being burned in the event that the fuse should blow. To avoid such an accident, a flexible current conducting member 24 is provided which may be placed in circuit between the bus bar and one of the contact blocks before the fuse is connected between said bus bar and contact block, whereby a shunt connection is established to prevent blowing of the fuse. After the fuse is once placed in the circuit, the flexible current conducting member may be easily and quickly withdrawn from the circuit without any danger to the operator even if the fuse then blows. One end of the flexible current conducting member has a split plug terminal 25, which is adapted to be received in any one of the plug sockets 26 formed integrally with the bus bar 22. The opposite end of the flexible current conducting member is provided with an attaching ear 27 having an open slot 28, by means of which the latter may be readily connected to an associated contact block by a stud 29. As shown at the left hand side of Figure 1, the current conducting member 24 is set in position to electrically connect the bus bar 22 and one of the contact blocks 20. It is now safe to connect said bus bar and contact block with a fuse, whereupon, as explained above, the current conducting member 24 may be withdrawn by merely pulling on the same to disconnect is from the circuit. In other words, the current conducting member 24 may be said to have a slip connection with the contact parts in question, whereby it may be easily connected in circuit and disconnected therefrom. A similar shunt connection, including an ammeter, may be used, whereby current may be measured.

Preferably, the distribution box is made of metal and accordingly, the current conducting parts mounted within said box are insulated therefrom. For example, the bus bar 22 and the conductor clamps and contact blocks are mounted upon an insulating member 30, suitably spaced from the associated wall of the box. Other insulating members 31 and 32 protect said current conducting members from other parts of the box.

From so much of the description as has heretofore been given, it will be understood that the improved process contemplated by the invention consists in first isolating one of the fuses from the remaining fuses, thereafter shunting the current around the fuse gap, replacing the old fuse by a new one, and thereafter destroying the shunt circuit.

By means of this distribution box combination, an arrangement is provided to meet the various commercial requirements.

I claim:

In a device of the class described, the combination of a distribution box, a plurality of contact blocks mounted therein, a main feeder electrically connected to one of said contact blocks, branch feeders electrically connected to others of said contact blocks, a bus bar mounted in said box and having a plurality of slip plugs sockets, fuses normally connecting said contact blocks and bus bar, and current conducting means having an attaching ear at one end for connection to a contact block and at the other end having a slip plug adapted to be received by said sockets to form a readily removable shunt connection around a fuse as the latter is placed in circuit.

Signed at Chicago, Illinois, this 30th day of June, 1925.

JOSEPH RAH.